United States Patent Office 3,772,333
Patented Nov. 13, 1973

3,772,333
BENZOXANTHENE AND BENZOTHIOXANTHENE
DYESTUFFS
Ernst Spietschka, Oberauroff, Taunus, and Jurgen Hohn, Kelsterbach, and Helmut Troster, Frankfurt am Main, Germany, assignors to Farbwerke Hoechst Aktiengesellschaft vormals Meister Lucius & Bruning, Frankfurt am Main, Germany
No Drawing. Filed May 20, 1971, Ser. No. 145,526
Int. Cl. C07d 7/42, 65/16
U.S. Cl. 260—327     6 Claims

ABSTRACT OF THE DISCLOSURE

Benzoxanthene or benzothioxanthene dyestuffs consisting of a mixture of isomers of the formulae

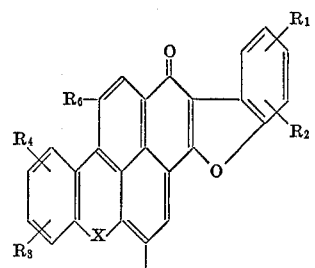

(1)

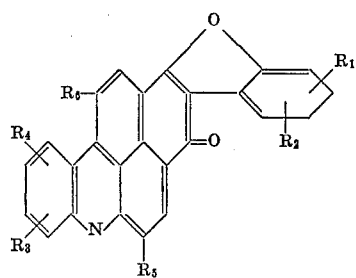

(2)

in which X is oxygen or sulfur, $R_1$ and $R_2$ are hydrogen or halogen, alkyl, aryl, alkoxy, acyl, acyloxy, carbalkoxy, nitro, alkylthio or alkylsulfonyl, $R_3$ and $R_4$ are hydrogen or halogen, alkyl, alkoxy, aryl, carbalkoxy or cyano, $R_5$ and $R_6$ are hydrogen or optionally substituted alkoxy. The dyestuffs have orange to bluish red shades and may be used for dyeing and printing of synthetic materials as well as for mass dyeing of synthetic fiber-forming polymers. The dyeings thus obtained are distinguished by a high brilliance of shade, good fastness properties to light and very good fastness properties to wet processing and thermofixation. Furthermore, the dyestuffs may be used as fluorescent dyestuffs for the coloring of synthetic polymers in the melt.

---

The present invention provides novel valuable benzoxanthene and benzothioxanthene dyestuffs consisting of a mixture of isomers of the following general formulae (1) and (2)

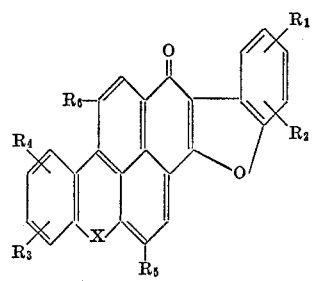

(1)

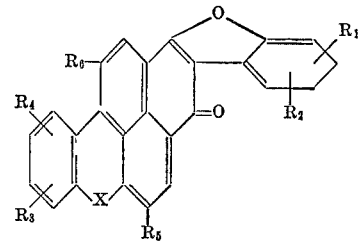

(2)

in which X stands for an oxygen or sulfur atom, $R_1$ and $R_2$ each stands for a hydrogen or halogen atom, an alkyl, aryl, acyloxy, acyl, carbalkoxy, alkoxy, nitro, alkylthio or alkylsulfonyl group, $R_3$ and $R_4$ each stands for a hdrogen or halogen atom, an alkyl, alkoxy, aryl carbalkoxy or cyano group, $R_5$ and $R_6$ each stands for a hydrogen atom or an optionally substituted alkoxy group.

This invention furthermore provides a process for the preparation of these compounds as specified hereinafter.

Exemplary of the substituents $R_1$ and $R_2$ are, especially, alkyl radicals, such as methyl, ethyl, butyl, or the corresponding alkoxy radicals thereof, halogen atoms, preferably the chlorine and bromine atoms, as well as nitro groups. $R_1$ and $R_2$ may furthermore stand for acyl, acyloxy, carbalkoxy, alkylthio or alkylsulfonyl groups derived from the above-mentioned alkyl groups. $R_3$ and $R_4$ stand for hydrogen atoms, halogen atoms, preferably a chlorine or bromine atom, cyano groups, aryl groups, especially phenyl, or alkyl, alkoxy or carbalkoxy groups as cited for the meanings of $R_1$ and $R_2$. The alkoxy groups specified for $R_5$ and $R_6$ may be substituted, for example, by a halogen atom, preferably a chlorine or bromine atom, a hydroxy, alkoxy, acyloxy or aryl group, especially the phenyl group. Examples thereof are the following groups: Ethoxy, β-chloroethoxy, β-hydroxy-ethoxy, β-acetoxy-propoxy and benzyloxy groups.

The dyestuffs of the invention are obtained by heating benzoxanthene- or benzothioxanthene-3,4-dicarboxylic acid anhydrides of the general Formula 3 or the derivatives thereof of the general Formula 4

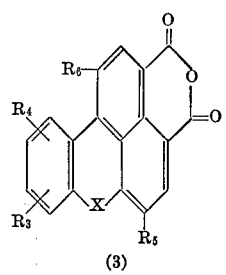

(3)

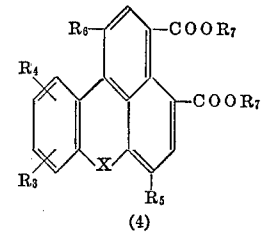

(4)

in which formulae X, $R_3$, $R_4$, $R_5$ and $R_6$ are defined as above, and $R_7$ stands for a hydrogen atom or a lower alkyl group, for example a methyl group, together with a compound of the Formula 5 and/or 5a

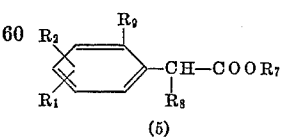

(5)

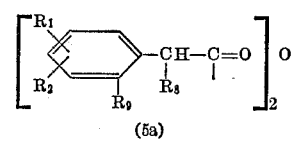

(5a)

in which formulae $R_1$, $R_2$ and $R_7$ are defined as above, $R_8$ stands for a hydrogen atom or a hydroxy group and $R_9$ stands for a hydroxy, alkoxy, acyloxy, alkyl-sulfonyloxy or arylsulfonyloxy group or a halogen atom, for example chlorine or bromine, at temperatures of from about 180° to about 280° C. in the presence of alkaline agents.

The dyestuffs are prepared via the intermediates of the Formulae 6 and 7, respectively,

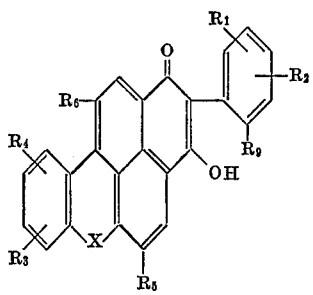

(6)

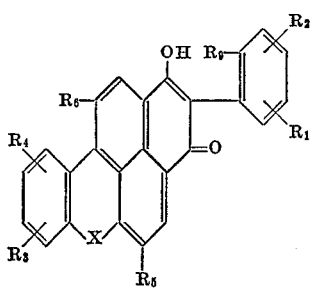

(7)

For the preparation of the dyestuffs it is, however, not necessary to isolate these intermediates, but it is advantageous to heat the benzoxanthene- or benzothioxanthene-dicarboxylic acid derivatives of the Formula 3 or 4 at temperatures between 180° and 280° C., preferably between 200° and 260° C., for a prolonged period of time, together with at least equimolar, suitably excess, amounts of the methyleneactive compounds of the Formulae 5 and/or 5a in the presence of alkaline agents, for example an alkali metal acetate, hydroxide or carbonate. Condensation may be performed either in the absence or in the presence of suitable high-boiling solvents, for example dimethyl-acetamide, N-methylpyrrolidone, hexamethyl-phosphoric acid triamide, dimethylsulfoxide, nitrobenzene, α-chloronaphthalene or quinoline, the reaction time and temperature depending on the solvent used.

When condensation is performed in the absence of an organic solvent, it is advantageous to use the methylene-active component of the Formulae 5 and/or (a) in an excess, suitably of from 1.5 to 5 mols. In many cases, the isomer mixture of the Formulae 1 and 2 formed during the reaction precipitates upon cooling in the presence of an organic solvent and may then be isolated in usual manner. In some cases, it is necessary to precipitate the dyestuff mixture by adding a low-boiling solvent, for example methanol. For a condensation in the absence of solvents it is advantageous to separate the dyestuff by diluting the reaction mixture with a suitable solvent, for example dimethylformamide, ethanol, methyl glycol, isobutanol or even acetic acid.

The dyestuffs obtained in this way consist of nearly equimolar amounts of the two isomers of the Formulae 1 and 2.

If the dyestuff molecule contains carboxy and/or phenolic hydroxy groups, these may be alkylated or acylated in known manner. As alkylating agents there may be used, especially, dialkyl-sulfates, alkyl-halides, alkylene oxides and arylsulfonic acid esters, such as dimethyl-sulfate, diethylsulfate, benzyl chloride, ethylene oxide, propylene oxide or p-toluene-sulfonic acid methyl ester; as acylating agents there may be used aliphatic or aromatic or amomatic carboxylic acid anhydrides, such as acetyl chloride, propionic acid chloride, benzoyl chloride, benzenesulfonic acid chloride or acetic acid anhydride.

The starting compound of the Formula 3 may be obtained by heating (a) The diazonium salts of compounds of the Formula 8

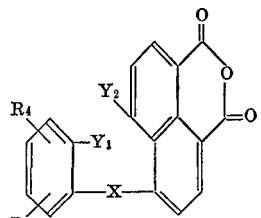

(8)

in which X, $R_3$ and $R_4$ are defined as above, $Y_1$ stands for a hydrogen atom and $Y_2$ for an amino group, or $Y_1$ for an amino group and $Y_2$ for a hydrogen atom, or (b) The diazonium salts of compounds of the Formula 9

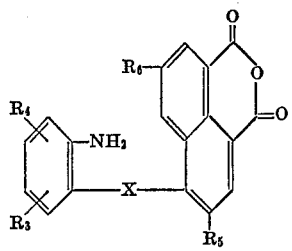

(9)

in which X, $R_3$, $R_4$, $R_5$ and $R_6$ are defined as above, in the presence of copper or copper salts.

The novel compounds obtainable according to the invention are valuable orange to bluish red dyestuffs. They are excellently suitable for the dyeing of synthetic materials, for example cellulose diacetate or cellulose triacetate, especially polyethylene-glycol terephthalate or polycyclohexane-diol terephthalate. The dyeings obtained are distinguished by a high brilliance of shade and good fastness properties to light and very good fastness properties to wet processing and thermofixation.

Moreover, the products of the invention are suitable for the dyeing of synthetic fiber-forming polymers, for example polyethylene-glycol terephthalate or polyamides, in the melt. These dyestuffs can, furthermore, be used as fluorescent dyestuffs for the coloring of synthetic polymers, such as polystyrene, polyvinyl chloride, polymethacrylate, polyethylene and polypropylene, in the melt. Owing to the good solubility of some of them in conventional organic solvents, many of the dyestuffs of the invention are also suitable for the coloring of oils, lakes and waxes.

The following examples serve to illustrate the invention.

EXAMPLE 1

24.3 g. of 1,6-dimethoxy-benzothioxanthene-3,4-dicarboxylic acid anhydride, 18.2 g. of o-hydroxy-phenylacetic acid and 20 g. of potassium carbonate were heated in 70 g. of nitrobenzene at a temperature of 210° C. for 4 hours. The mixture was allowed to cool and the precipitated reaction product was separated by suction-filtration, washed with methanol and water and dried. The dyestuff of the formulae

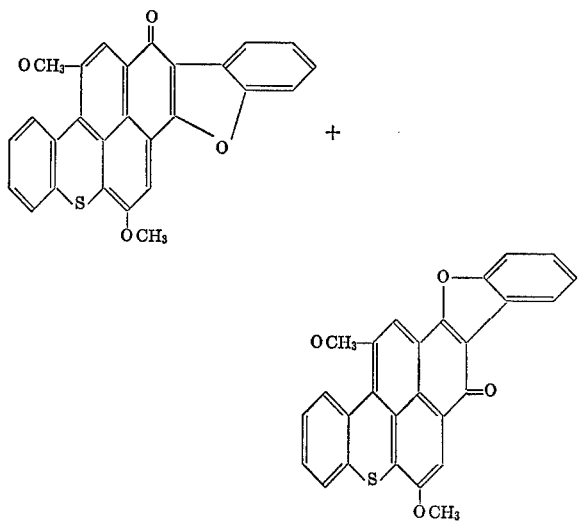

that crystallized in violet scales dyes polyester a brilliant bluish red shade.

EXAMPLE 2

A mixture of 75 g. of benzothioxanthene-3,4-dicarboxylic acid anhydride, 90 g. of o-chlorophenyl-acetic acid and 90 g. of potassium acetate was melted at 230° C. while the reaction water formed was distilled off. After about 4 hours, the mixture was allowed to cool to 200° C., 300 g. of dimethylformamide were added, the mixture was refluxed for 1 hour, then allowed to cool to room temperature, and the isomer mixture of the formulae

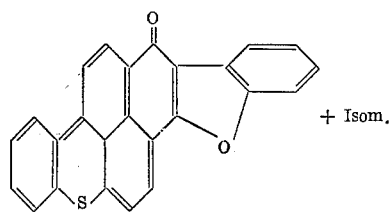

was suction-filtered, washed with hot water until free from salts and dried. The reaction product obtained in a good yield is absorbed by polyester with a brilliant red shade which has a good fastness to light and a very good fastness to wet processing and thermofixation. The compound crystallized from dimethylformamide in dark red scales and provided the following analytical data:

*Analysis.*—Calcd. (percent): C, 79.8; H, 3.2; S, 8.5. Found (percent): C, 79.7, H, 3.2; S, 8.5.

EXAMPLE 3

10.6 g. of 9-chloro-10-methyl-benzothioxanthene-3,4-dicarboxylic acid dimethyl ester obtained by usual methylation of an alkaline solution of the dicarboxylic acid with dimethylsulfate, 16.2 g. of o-methoxyphenyl-acetic acid and 8 g. of anhydrous potassium acetate were heated in 40 ml. of N-methylpyrrolidone at 210° C. for 3 hours. After cooling of the reaction mixture, 50 g. of 2 N acetic acid were added and the precipitated isomer mixture of the formula

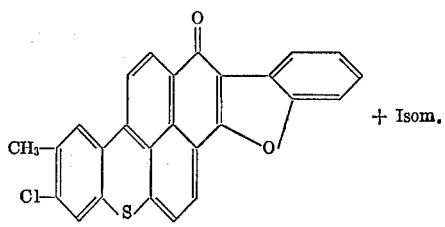

was isolated in known manner. The dyestuff dyes polyester fibers brilliant bluish red shades having good fastness to light and thermofixation.

EXAMPLE 4

9.6 g. of 6-methoxy-benzothioxanthene-3,4-dicarboxylic acid anhydride, 25.5 g. of o-chlorophenyl-acetic acid and 15 g. of potassium acetate were intimately mixed and the mixture was melted at 230° C. for 3 hours. When the reaction was complete, the melt was cooled to 180° C., 75 g. of dimethyl-formamide were added and the whole was refluxed until entirely dissolved. Subsequently, the solution was allowed to cool and the precipitated reaction product was suction-filtered, washed with methanol and hot water and dried. The isomer mixture obtained in crystals of the formula

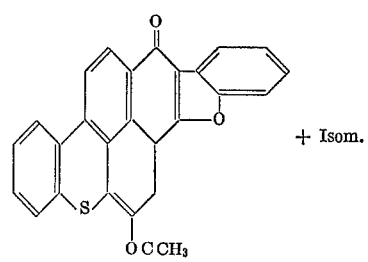

dyes polyester a brilliant blush red shade that shows good fastness properties.

EXAMPLE 5

7.5 g. of 9,10-dimethyl-benzothioxanthene-3,4-dicarboxylic acid anhydride, 9 g. of 2,4-dichlorophenyl-acetic acid and 9 g. of potassium acetate were heated in 50 cc. of α-chloronaphthalene at 230° C. for 3 hours.

When the reaction was complete, the mixture was allowed to cool, the precipitated product was suction-filtered, washed with methanol and dried. The bluish red isomer mixture of the formula

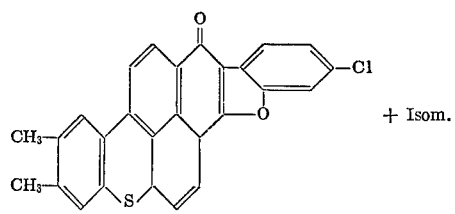

is excellently suitable as a fluorescent dyestuff for polystyrene and polyvinyl chloride.

EXAMPLE 6

A mixture of 17.3 g. of benzoxanthene-3,4-dicarboxylic acid anhydride, 10.0 g. of potassium acetate and 41.0 g. of 2-acetoxy-phenylacetic acid was kept boiling in 200 ml. of N-methyl-pyrrolidone for 4 hours. Subsequently, the reaction mixture was diluted with 200 ml. of methanol at room temperature, the precipitated orange dyestuff was suction-filtered and washed with methanol and hot water. To eliminate a small amount of starting material the moist filter cake was boiled with 180 ml. of a 1% potassium hydroxide solution. The dyestuff, isolated as usual, of the formula

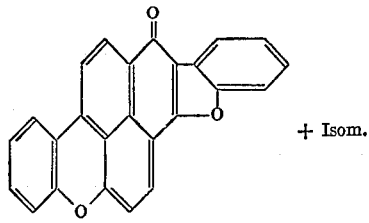

+ Isom.

dyes polyester materials brilliant orange shades fast to light.

EXAMPLE 7

15.9 g. of 10-methoxy-benzoxanthene-3,4-dicarboxylic acid anhydride, 9.5 g. of potassium acetate and 55 g. of 2-methoxy-5-bromophenyl-acetic acid were carefully mixed and stirred for 3 hours at 220–230° C. The reaction mixture was then diluted at 150° C. with 250 ml. of dimethylformamide and maintained at 150° C. for 1 hour. The orange dyestuff of the formula

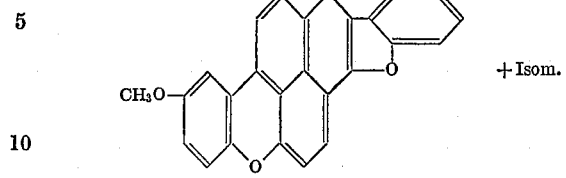

+ Isom.

was isolated in known manner. On polyester fibers brilliant red orange dyeings are obtained which have very good general fastness properties.

The following table contains further orange to red violet dyestuffs which were obtained which have very good general fastness properties.

The following table contains further orange to red violet dyestuffs which were obtained in a manner analogous to that disclosed in the above examples.

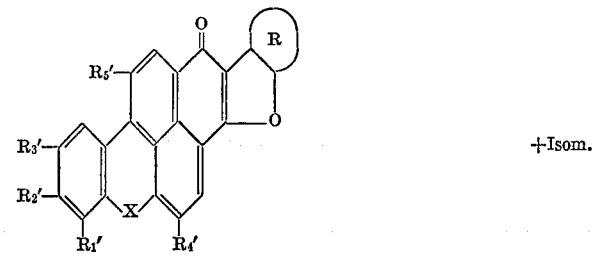

+ Isom.

TABLE

| Example | X | $R_1'$ | $R_2'$ | $R_3'$ | $R_4'$ | $R_5'$ | ® |
|---|---|---|---|---|---|---|---|
| 8, 9 | O, S | H | Cl | H | H | $OCH_3$ | —⟨ ⟩—$COH_3$ |
| 10, 11 | O, S | H | $CH_3$ | $CH_3$ | H | H | —⟨ ⟩ with $CH_3$ |
| 12 | S | $CH_3$ | H | H | $OCH_3$ | H | —⟨ ⟩—Cl |
| 13, 14 | O, S | H | H | Br | $OC_2H_5$ | $OC_2H_5$ | —⟨ ⟩ |
| 15, 16 | O, S | H | $OCH_3$ | H | H | H | —⟨ ⟩ |
| 17, 18 | O, S | H | H | $OCH_3$ | H | H | —⟨ ⟩ with $CH_3$ |
| 19, 20 | O, S | H | $OCH_3$ | H | $OC_2H_5$ | H | —⟨ ⟩ |
| 21, 22 | O, S | H | $CH_3$ | $CH_3$ | H | H | —⟨ ⟩ with Br |
| 23, 24 | O, S | H | Br | H | H | H | —⟨ ⟩—$NO_2$ |
| 25 | S | H | H | $OCH_3$ | H | $OC_2H_5$ | —⟨ ⟩ |

TABLE—Continued

| Example | X | $R_1'$ | $R_2'$ | $R_3'$ | $R_4'$ | $R_5'$ | ® |
|---|---|---|---|---|---|---|---|
| 26, 27 | O, S | $CH_3$ | H | H | H | H | 4-CH₃-phenyl-I |
| 28 | S | H | Cl | H | $OCH_3$ | $OCH_3$ | 2,5-diBr-phenyl-I |
| 29, 30 | O, S | H | H | $OCH_3$ | H | H | 4-NO₂-phenyl-I |
| 31, 32 | O, S | H | $OCH_3$ | H | $OC_2H_4OH$ | H | phenyl-I |

We claim:

1. Benzoxanthene or benzothioxanthene dyestuffs consisting of a mixture of a compound of the formula

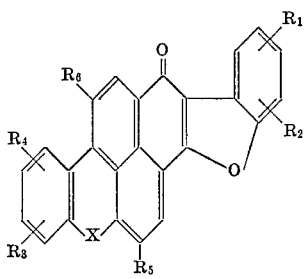

and its corresponding isomer of the formula

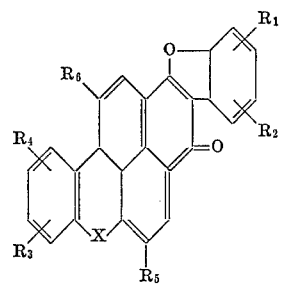

in which formulas X stands for an oxygen or sulfur atom, $R_1$ and $R_2$ each stands for a hydrogen or halogen atom, an alkyl, alkoxy, acyl, acyloxy, carbalkoxy, nitro, alkylthio or alkylsulfonyl group, $R_3$ and $R_4$ each stands for a hydrogen or halogen atom, an alkyl, alkoxy, carbalkoxy or cyano group, $R_5$ and $R_6$ each stands for a hydrogen atom or an alkoxy group which may be substituted by halogen, hydroxy, alkoxy, or acyloxy groups, all of the foregoing acyl and acyloxy groups being derived from carboxylic acids and the alkyl moieties of all of the foregoing radicals which include such moieties having from 1 to 4 carbon atoms.

2. The dyestuff consisting of the isomer mixture of the formulae

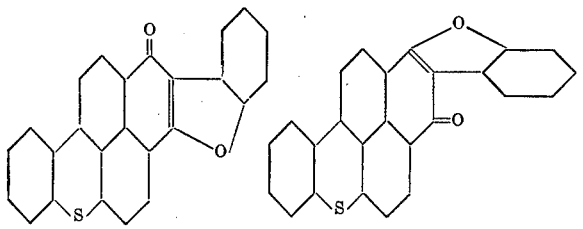

3. The dyestuff consisting of the isomer mixture of the formulae

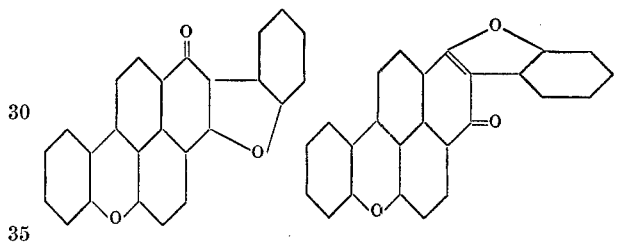

4. The dyestuff consisting of the isomer mixture of the formulae

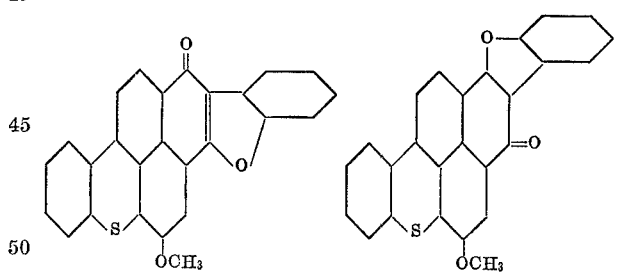

5. The dyestuff consisting of the isomer mixture of the formulae

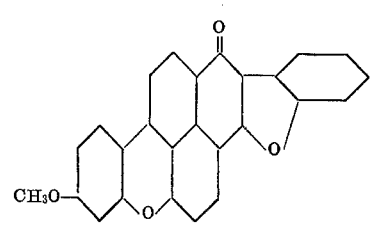

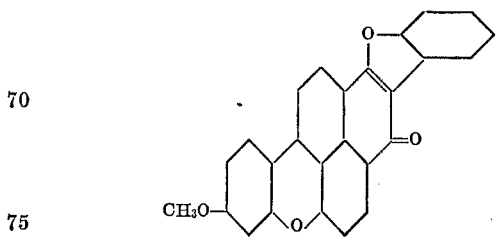

6. The dyestuff consisting of the isomer mixture of the formulae
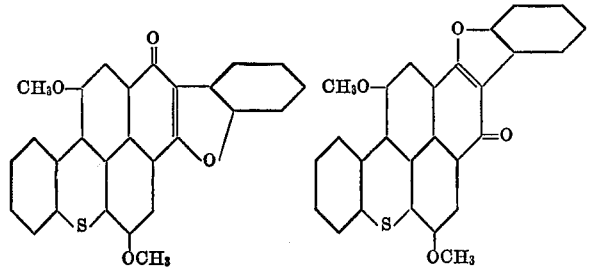
References Cited
Weiss et al.: "Tetrahedron Letters," No. 49, pp. 4325–28 (1969).
HENRY R. JILES, Primary Examiner
R. T. BOND, Assistant Examiner
U.S. Cl. X.R.
8—62, 162 R; 260—335

UNITED STATES PATENT OFFICE
CERTIFICATE OF CORRECTION

Patent No. 3,772,333          Dated November 13, 1973

Inventor(s) Spietschka et al.

It is certified that error appears in the above-identified patent and that said Letters Patent are hereby corrected as shown below:

In the Heading:

After "Ser. No. 145,526" insert

--Claim Priority, application Germany,

May 23, 1970, P 20 25 290.8--.

Signed and sealed this 16th day of July 1974.

(SEAL)
Attest:

McCOY M. GIBSON, JR.
Attesting Officer

C. MARSHALL DANN
Commissioner of Patents